United States Patent [19]

Ishi et al.

[11] 4,178,017
[45] Dec. 11, 1979

[54] SAFETY BAG INFLATION APPARATUS WITH EXTENDIBLE GUARD MEMBER AGAINST CONTACT OF BAG WITH HEATED GAS GENERATOR

[75] Inventors: Takashi Ishi, Sayama; Takuzi Murakami, Tokorozawa; Masayoshi Kato, Shiki; Tadahiko Nagaoka, Tokorozawa, all of Japan

[73] Assignee: Nissan Motor Company, Limited, Yokohama, Japan

[21] Appl. No.: 831,239

[22] Filed: Sep. 7, 1977

Related U.S. Application Data

[62] Division of Ser. No. 621,603, Oct. 10, 1975, Pat. No. 4,068,862.

[30] Foreign Application Priority Data

Nov. 20, 1974 [JP] Japan .................... 49-133866
Apr. 30, 1975 [JP] Japan .................... 50-59155
May 24, 1975 [JP] Japan .................... 50-69884

[51] Int. Cl.² .................................................. B60R 21/08
[52] U.S. Cl. ...................................... 280/740; 280/742
[58] Field of Search ............................. 280/728–743; 102/39

[56] References Cited

U.S. PATENT DOCUMENTS

| | | | |
|---|---|---|---|
| 3,532,360 | 10/1970 | Leising | 280/736 |
| 3,552,770 | 1/1971 | Berryman | 280/740 |
| 3,618,976 | 11/1971 | Leising | 280/740 |
| 3,797,853 | 3/1974 | Grosch | 280/740 |
| 3,799,573 | 3/1974 | McDonald | 280/740 |
| 3,799,575 | 3/1974 | Kurze | 280/743 |
| 3,819,205 | 6/1974 | Dunford | 280/740 X |
| 3,843,151 | 10/1974 | Lewis | 280/736 |
| 3,891,233 | 6/1975 | Damon | 280/737 |
| 3,907,330 | 9/1975 | Kondo | 280/736 |
| 3,958,949 | 5/1976 | Plantif | 102/39 X |

*Primary Examiner*—John P. Silverstrim

[57] ABSTRACT

A gas generator including a combustible composition is covered with a guard member, which is adapted in shape to the gas generator and has slits, notches or folds arranged such that the member is locally extended outwards upon actuation of the gas generator to prevent contact of the bag with the heated gas generator.

8 Claims, 12 Drawing Figures

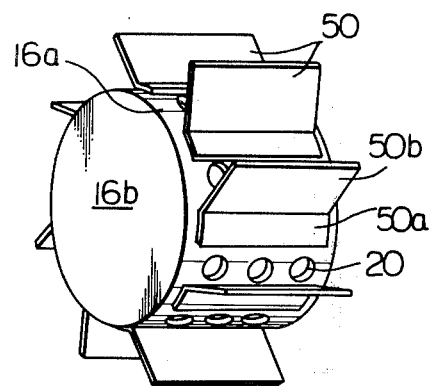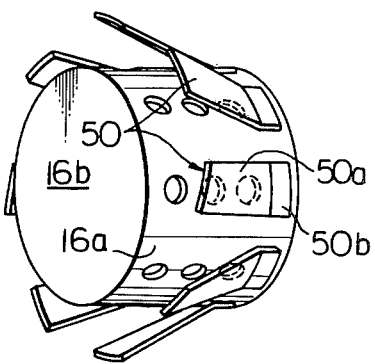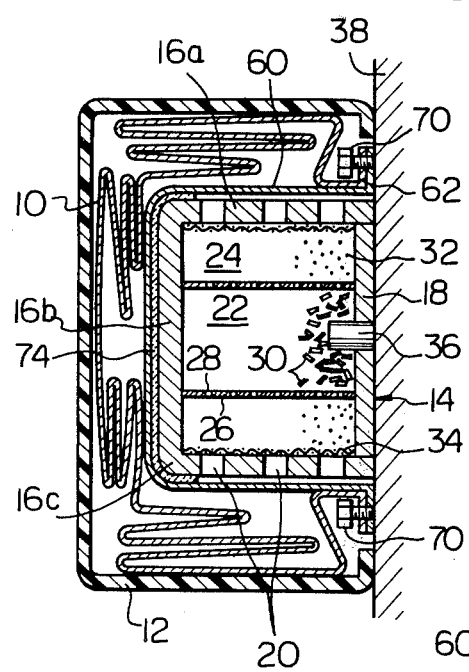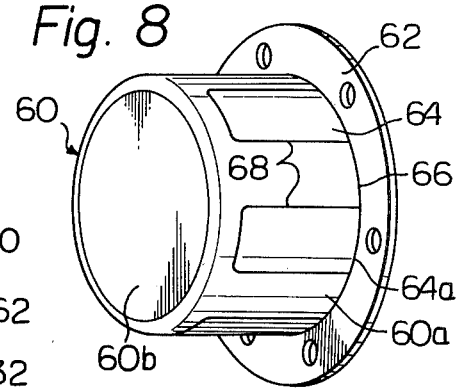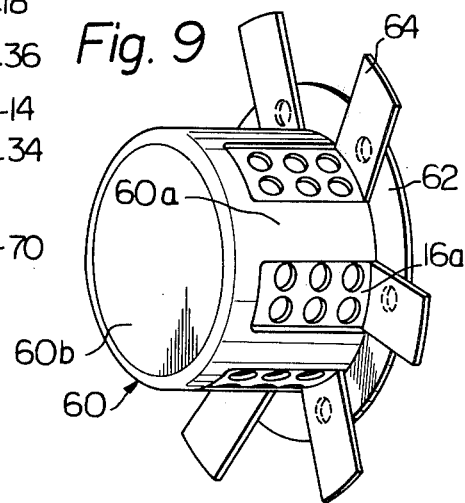

SAFETY BAG INFLATION APPARATUS WITH EXTENDIBLE GUARD MEMBER AGAINST CONTACT OF BAG WITH HEATED GAS GENERATOR

This is a division, of application Ser. No. 621,603, Filed Oct. 10, 1975, now U.S. Pat. No. 4,068,862.

This invention relates to safety apparatus which includes an inflatable bag and a gas generator having a combustible composition for inflating the bag, and more particularly to such apparatus which includes additionally a guard member to protect the bag and any person against contact with the gas generator in a heated state after ejection of gas therefrom.

There are a group of safety apparatus which are characterized by comprising an inflatable bag and a gas generator for inflation of the bag and exemplified by lifeboats and apparatus for protection of car passengers in collision of the car. The gas generator of such apparatus uses in many cases a combustible solid-phase composition as the gas source for several reasons such as compactness, stability during storage and quick response to actuation. The composition evolves a high temperature gas upon combustion, but the bag is made of a relatively poorly heat-resistant material such as cloth or synthetic resin sheet. The gas generator, therefore, usually includes a heat-absorbing material which is arranged to let pass the combustion gas therethrough and lower the gas temperature before discharge of the gas.

It is commonly required that the described apparatus be made as compact as possible in the ready-to-work state. This requirement is particularly severe when the apparatus is mounted on an automotive steering wheel at its central region for the protection of the driver. This requirement cannot be met unless the gas generator is small-sized. The volume of the gas generator is determined mainly by the volumes of the combustible composition and heat-absorbing material. Since the volume or quantity of the combustible composition cannot be decreased to inflate a definite bag, the volume of the heat-absorbing material is made as small as possible by appropriate selection of the material and/or skillful arrangement in packing it into the gas generator.

When the gas generator is actuated and the bag is inflated, the heat-absorbing material achieves its mission of reducing the gas temperature with a considerable increase in its own temperature. Then, the housing of the gas generator is heated by heat conduction from the heat-absorbing material to a temperature above the gas temperature in the inflated bag. When the inflated bag diminishes or deflates at least partially after accomplishment of its role of protecting a car passenger during a collision, the bag may possibly come into contact with the heated housing and be burnt. When the bag is made of a synthetic resin, there is a fear of evolution of a noxious gas upon burning of the bag. Besides, there is a danger of a person being burnt by contact with the heated housing.

It is an object of the present invention to provide a safety apparatus of the described type, which apparatus includes a guard member for protecting the once inflated bag and a person staying near the bag from coming into contact with the heated housing of the gas generator.

A safety apparatus according to the invention comprises a conventional gas generator which includes a housing with a plurality of gas outlets formed in a wall thereof, a combustible gas-generating composition disposed in the housing and a heat-absorbing material disposed in the housing between the gas-generating composition and the outlets; a conventional inflatable bag which is folded and arranged such that the housing extends into the bag while the mouth of the bag is kept in a fixed position with respect to the housing. Accordingly, the bag is inflated when a combustion gas is discharged from the outlets of the housing. The apparatus is characterized by further comprising a guard member which is adapted in shape to the housing of the gas generator and placed between the outer surface of the housing and the bag. A portion of the guard member is of such a specific construction that this portion covers at least a portion of the gas outlets of the housing and extends away from the aforementioned wall of the housing when the gas is discharged from the outlets, but this portion is inseparable from the remaining portion of the guard member.

The thus extended portion of the guard member supports the bag when the bag approaches the housing subsequently to inflation and prevents the bag from coming into contact with the heated housing.

According to an embodiment of the invention, the guard member is a flexible plate which is fixed to the housing at a portion other than the extendible portion. The extendible portion moves away from the aforementioned wall of the housing by being either folded or unfolded along a preliminarily determined line.

According to another embodiment of the invention, the guard member is shaped to have a hollow which is generally similar in shape to but slightly larger than the exterior of the housing. This guard member is arranged at a fixed position with respect to the housing such that the housing is received in the hollow and spaced from the guard member. A plurality of either slits or notches are formed in a wall of this guard member to form a plurality of petals which are arranged each to cover a portion of the gas outlets of the housing and unfolded outwardly of the housing when the gas generator is actuated.

Other features and advantages of the invention will become apparent from the following detailed description of preferred embodiments thereof with reference to the accompanying drawings, wherein:

FIGS. 5 and 6 are perspective views fundamentally similar to FIG. 3, but show two different modifications of the guard members, respectively;

FIGS. 7 to 10 are generally similar views to FIGS. 1 to 4, respectively, but show a differently constructed guard member as another preferred embodiment of the invention;

Figure 1:
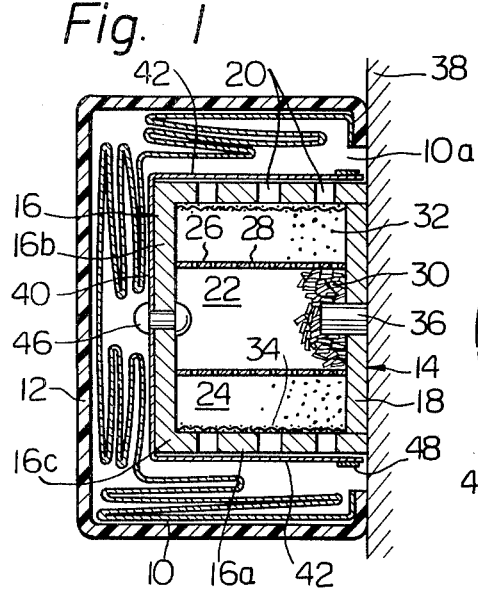
FIG. 1 shows a longitudinal section of a safety apparatus for the protection of a car passenger as a preferred embodiment of the invention.

In a safety apparatus for the protection of a car passenger shown in FIG. 1, an inflatable bag 10 is folded up and received in a generally cup-shaped protector 12 such that the mouth 10a of the bag 10 substantially coincides with the open end of the protector 12. The folded bag 10 is positioned relatively close to the bottom and side wall of the protector 12 so that a generally cylindrical space is left in the protector 12 to receive therein a gas generator 14. The gas generator 14 has a cylindrical or cup-shaped housing 16 with a fixed lid member 18 and a plurality of gas discharge holes or outlets 20 formed in the peripheral wall 16a. The interior of the housing 16 is divided into a central cylindrical combustion chamber 22 and a cooling chamber 24 surrounding the former chamber 22 by a cylindrical partition 26 which has a multiplicity of apertures 28. The combustion chamber 22 is charged with a combustible gas-generating composition 30 which is usually in the form of pellets, and the cooling chamber 24 is filled with granular heat-absorbing material 32 which is prevented from being discharged through the holes 20 by a porous spacer 34, e.g., of a wire screen. The gas generator 14 and the protector 12 are mounted on a support member 38, e.g., a central portion of a steering wheel. An electrically initiatable igniter 36 is attached to the lid member 18 to extend into the combustion chamber 22.

Upon initiation of the igniter 36 in a collision of the automobile, the composition 30 is ignited and underdoes a self-sustained combustion with evolution of a high temperature combustion gas. The combustion gas is ejected through the holes 20 generally radially of the housing 16 after it is cooled sufficiently by passing through the column of the heat-absorbing material 32. Consequently, the bag 10 is inflated and expands mainly in the axial direction of the gas generator 14. The protector 12 is made of a fragile material and/or of a fragile construction, so that it is broken at least at its bottom by the impulsive inflation of the bag 10. The thus inflated bag 10 offers cushion against the forward movement of the driver by inertia and prevents him from colliding with the steering wheel 38. In the above described respects, both in arrangement and in operation, the safety apparatus of FIG. 1 does not differ from conventional apparatus for the same purpose.

Figure 2:
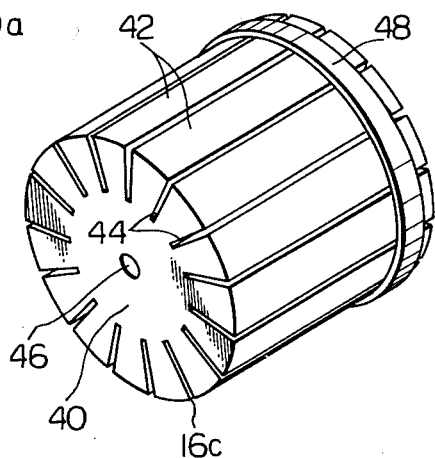
FIG. 2 is a perspective view of a gas generator covered with a guard member as part of the apparatus of FIG. 1.
Figure 3:
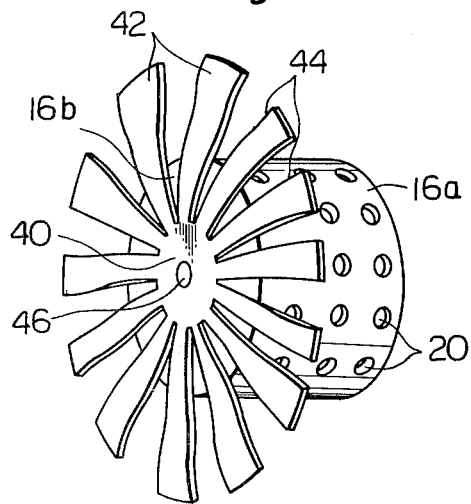
FIG. 3 shows the same as FIG. 2 but in a state after actuation of the gas generator.

According to the invention, a guard member 40 is attached to the gas generator 14 for preventing the bag 10 from coming into contact with the housing 16 after the bag 10 is once inflated. As seen in FIGS. 2 and 3, the guard member 40 is fundamentally in the shape of a circular plate, but is formed to have a plurality of petals 42 each bordered by radial and narrow slits 44 extending from the circumference of the plate 40 to a smaller and concentric circle drawn relatively close to the center. The guard member 40 is made of a resilient and somewhat heat resistant material such as a metal sheet, rubber sheet or a synthetic resin sheet. The material has preferably a relatively low heat conductivity. The guard member 40 is fastened to the outer surface of the bottom 16b of the housing 16 e.g. with a rivet 46. The petals 42 are bent at the shoulder 16c of the housing 16 substantially at a right angle so that the petals 42 may cover a major part of the outer surface of the peripheral wall 16a of the housing 16. The slits 44 are formed at such intervals that each petal 42 covers a portion of the gas discharge holes 20. The petals 42 are held in position as shown in FIG. 2 with a hoop 48 of a fragile material such as, e.g., aluminum or plastics, which is arranged relatively close to the lidded end of the housing 16.

Figure 4:
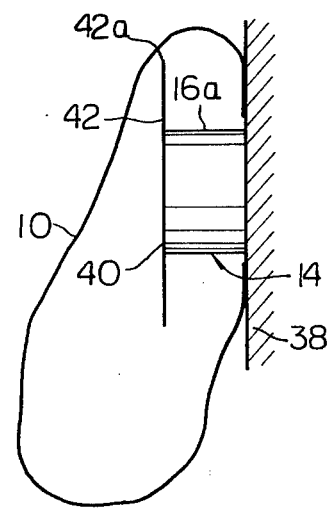
FIG. 4 is a sketch of the apparatus of FIG. 1 in a state a little time after operation.

When the combustion gas is discharged from the gas generator 14, the hoop 48 is broken by the gas pressure and impulse of the gas flow acting on the petals 42, so that the petals 42 straighten and extend radially of the housing 16 as seen in FIG. 3. Referring to FIG. 4, when the bag 10 slackens or droops on account of its dead weight subsequently to a full inflation, the bag 10 is locally held by some of the petals 42 at their extending ends 42a. Accordingly, the bag 10 is prevented from coming into contact with the housing 16 which has been heated considerably and being burned with evolution of a noxious gas. Besides, the driver is protected against a burn by coming into contact with the heated housing 16 when he approaches the steering wheel 38 with deflation or diminution of the inflated bag 10.

In a modification shown in FIG. 5, the single guard plate 40 of FIG. 1 is replaced by a plurality of guard plates 50 which are shaped generally rectangular. Each plate 50 is fixed at an edge region 50a thereof to the outer surface of the peripheral wall 16a of the housing 16 arranged generally in the axial direction of the housing 16. Each plate 50 is folded along the border of the fixed region 50a so that the remaining region 50b thereof is laid along the peripheral wall 16a to cover a portion of the gas discharge holes 20 when no external force is acting thereon. The extending or flapping function of the guard plates 50 after the actuation of the gas generator 14 is substantially similar to that of the guard plate 40 as will be understood from FIG. 5 with reference to FIG. 4. Alternatively, the guard plates 50 may be arranged such that the fixed regions 50a are arranged circumferentially and close to the lidded end of the housing 16 as shown in FIG. 6. Also it will be understood that the guard plates 50 are convenient to application to a slightly different gas generator which has the gas discharge holes 20 not in the peripheral wall 16b but in the bottom 16a of the housing 16.

In the following embodiments, a fundamentally similar guard against heat conduction from the heated housing 16 of the gas generator 14 to the bag 10 is accomplished by the use of a guard member which is not preliminarily fixed to the housing 16 but combined with the gas generator 14 at assemblage of the described safety apparatus taking into consideration the convenience to practical fabrication of the gas generator 14.

Referring now to FIGS. 7-9, a safety apparatus of FIG. 7 includes the inflatable bag 10, the protector 12 and the gas generator 14 similarly to the apparatus of FIG. 1 except that the gas generator 14 has not the guard plate 40 and that a separate guard member 60 is arranged in the protector 12 to enclose therein the gas generator 14 at a short distance therefrom.

The guard member 60 is made of a metal or a heat-resistant synthetic resin and shaped cup-like with a flange 62 at its open end as seen in FIGS. 8 and 9. The inner diameter and the depth of the guard member 60 are slightly larger than the outer diameter and height of the housing 16 of the gas generator 14, respectively. The peripheral wall 60a of the guard member is locally slitted as shown in FIG. 8 so that the wall 60a is partly occupied by a plurality of petals 64 which are inseparable from the wall 60a and unfoldable along the inner circumference 66 of the flange 62. The petals 64 are never unfolded prior to assemblage with the gas generator 14 so that they may be kept in the closed or folded positions by the use of no external means. An adhesive, however, may be applied to the slits 68. The guard member 60 is assembled with the other elements of the safety apparatus such that the housing 16 is covered with but separate from the guard member 60 both axially and radially. The flange 62 of the guard member 60 is fastened to the support member, e.g., the central region of the steering wheel 38 with bolts 70, for example.

Figure 10:
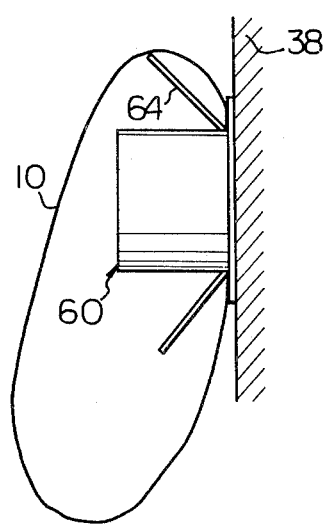

When the gas generator 14 ejects the combustion gas, the petals 64 are unfolded and spread radially of the guard member 60 as shown in FIG. 9. The inflation of the folded bag 10 begins at the same time. Since each petal 64 is unfolded around its edge 64a, which is relatively close to the mouth of the bag 10, and spread towards the support member 38, the bag 10 is not caught on the petals 64 and broken during inflation. As the bag 10 droops as the result of decrease in the bag pressure following the maximum inflation, the bag 10 is locally supported by some of the petals 64 as seen in FIG. 10 and protected against coming into contact with the heated housing 16 and being burnt.

The cup-shaped and petal-forming guard member 60 has the advantage that the guard member 60 is less liable to be broken in operation and do damages to the bag 10 or nearby persons. Besides, the petals 64 of the guard member 60 never extend towards the driver across the plane of the bottom 60b of the guard member 60.

Figure 11:
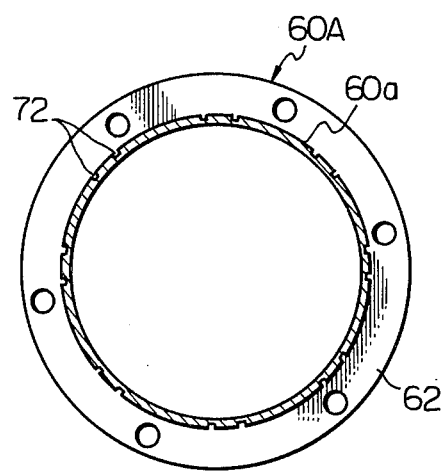
FIG. 11 is a cross section of a guard member which is the same as that of FIG. 8 except for replacement of slits in FIG. 8 by notches.

The slits 68 for forming the petals 64 may be replaced by notches 72 as shown in FIG. 11 if the notches 72 are deep enough to cause the peripheral wall 60a to be ripped along the notches 72 when the combustion gas is discharged from the gas generator 14. The use of the thus notched guard member 60A brings about perfect moisture-proof installation of the gas generator 14.

With respect to the gas generator 14 which has the radially formed gas discharge holes 20, the temperature of the housing 16 after completion of the combustion of the composition 30 is highest at its shoulder region 16c and the bottom 16b. The space between the housing 16 and the guard member 60 or 60A is helpful for lessening heat transfer from the housing 16 to the guard member 60 or 60A. The heat transfer can be suppressed further when the space is filled locally with a solid heat-insulating material indicated at 74 in FIG. 7 to cover the shoulder region 16c and the outer surface of the bottom 16b.

Figure 12:
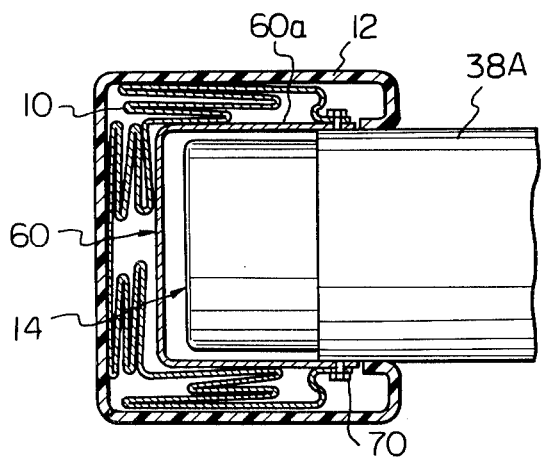
FIG. 12 is a generally similar view to FIG. 7 but shows a slight modification of the shape of the guard member to adapt the apparatus to a differently shaped support member.

The flange 62 is not always necessary. If the safety apparatus is attached to a cylindrical support member 38A as seen in FIG. 12, the guard member 60, 60A can be fastened to the support member 38A without provision of any flange 62 merely by axially extending its peripheral wall 60a to a certain extent with adjustment of its inner diameter.

In any of the above described embodiments, a guard member according to the invention has no particular projection and occupies only quite a small space around the gas generator 14 until the operation of the apparatus. The installation of the guard member, therefore, causes little enlargement of the described safety apparatus as a whole.

What is claimed is:
1. A safety apparatus comprising:
    a gas generator including a housing with a plurality of gas outlets formed in a wall thereof, a combustible gas-generating composition disposed in said housing, and a heat-absorbing material disposed in said housing between said gas-generating composition and said outlets;
    an inflatable bag folded and arranged such that said housing extends into said bag, the mouth of said bag in a fixed position with respect to said housing, so that said bag is inflated when a gas is discharged from said outlets; and
    a guard member of a metal which has a first portion and a petal-like second portion bounded by an imaginary line drawn substantially parallel to the outer surface of said wall of said housing and is entirely interposed between said inflatable bag and said wall, said first portion being kept permanently in a fixed position relative to said wall of said housing, said second portion assuming an initial position so as to cover at least a part of said gas outlets until discharge of said gas from said gas outlets and being unfoldable along said imaginary line such that said second portion assumes another position more distant from said wall than said initial position when said gas is discharged from said gas outlets and remains at said another position after completion of the discharge of said gas from said gas generator.

2. A safety apparatus comprising:
    a gas generator including a housing with a plurality of gas outlets formed in a wall thereof, a combustible gas-generating composition disposed in said housing, and a heat-absorbing material disposed in said housing between said gas-generating composition and said outlets;
    an inflatable bag folded and arranged such that said housing extends into said bag, the mouth of said bag being in a fixed position with respect to said housing, so that said bag is inflated when a gas is discharged from said outlets; and
    a guard member of a metal which has a first portion and a plurality of petal-like second portions each bounded from said first portion by an imaginary line drawn substantially parallel to the outer surface of said wall of said housing and is entirely interposed between said inflatable bag and said wall, said guard member being formed so as to enclose said housing, said first portion being kept permanently in a fixed position relative to said wall of said housing, each of said second portions assuming an initial position so as to cover a part of said gas outlets until discharge of said gas therefrom and being unfoldable along said imaginary line such that each of said second portions assumes another position more distant from said wall than said initial position when said gas is discharged from said gas outlets and remains at said another position after completion of the discharge of said gas from said gas outlets.

3. A safety apparatus comprising:
    a gas generator including a housing with a plurality of gas outlets formed in a wall thereof, a combustible gas-generating composition disposed in said housing, and a heat-absorbing material disposed in said housing between said gas-generating composition and said outlets;
    an inflatable bag folded and arranged such that said housing extends into said bag, the mouth of said bag being in a fixed position with respect to said housing, so that said bag is inflated when a gas is discharged from said outlets; and
    a guard member of a metal which is formed to have a hollow shaped generally similarly to and slightly larger than the exterior of said housing and is arranged in said inflatable bag at a fixed position with respect to said housing such that said housing is received in said hollow and spaced from said guard member, said guard member having a plurality of slits formed in a wall thereof covering said wall of said housing, each of said slits being distant from other slits and being arranged such that each slit and a shortest imaginary line drawn on said wall of said guard member to connect both ends of said each slit form the periphery of a petal covering a portion of said outlets, so that said petal is unfolded along said imaginary line in a direction opposite to said housing when said gas is discharged from said gas outlets and remains in the unfolded state after completion of the discharge of said gas from said gas outlets.

4. Apparatus as claimed in claim 3, wherein said housing and said guard member are generally cylindrical with said outlets in the peripheral wall of said housing, said imaginary line being in a circumference of said guard member and nearer said mouth of said bag than said each slit.

5. Apparatus as claimed in claim 3, wherein a portion of the space between said housing and said guard member is filled with a heat-insulating material, said outlets opening into the remaining portion of said space.

6. A safety apparatus comprising:
a gas generator including a housing with a plurality of gas outlets formed in a wall thereof, a combustible gas-generating composition disposed in said housing, and a heat-absorbing material disposed in said housing between said gas-generating composition and said outlets;
an inflatable bag folded and arranged such that said housing extends into said bag, the mouth of said bag being in a fixed position with respect to said housing, so that said bag is inflated when a gas is discharged from said outlets; and
a guard member of a metal which is formed to have a hollow shaped generally similarly to and slightly larger than the exterior of said housing and is arranged in said inflatable bag at a fixed position with respect to said housing such that said housing is received in said hollow and spaced from said guard member, said guard member having a plurality of notches formed in a wall thereof covering said wall of said housing, each of said notches being distant from other notches and in such a depth that said wall of said guard member is ripped along said notches when said gas is discharged from said outlets, each of said notches being arranged such that each of the ripped notches and a shortest imaginary line drawn on said wall of said guard member to connect both ends of said each notch, so that said petal is unfolded along said imaginary line in a direction opposite to said housing when said gas is discharged from said gas outlets and remains in the unfolded state after completion of the discharge of said gas from said gas outlets.

7. Apparatus as claimed in claim 6, wherein said housing and said guard member are generally cylindrical with said outlets in the peripheral wall of said housing, said imaginary line being in a circumference of said guard member.

8. Apparatus as claimed in claim 6, wherein a portion of the space between said housing and said guard member is filled with a heat-insulating material, said outlets opening into the remaining portion of said space.

* * * * *